Patented Feb. 20, 1940

2,190,915

UNITED STATES PATENT OFFICE 2,190,915

COPOLYMERS OF STYRENE WITH OITICICA OIL OR ITS DERIVATIVES

Shailer L. Bass, Sylvia M. Stoesser, and Robert D. Lowry, Midland, Mich., assignors to The Dow Chemical Company, Midland, Mich., a corporation of Michigan No Drawing. Application July 1, 1938, Serial No. 216,960

7 Claims. (Cl. 260—23)

The present invention relates to a new synthetic resin prepared from styrene and to a method of making the same.

Polymerized styrene, although exhibiting numerous properties which make it a very desirable resin, has certain characteristics which frequently are undesirable. It tends to blush or check on standing and to discolor on prolonged exposure to light; also it is soluble in many common organic solvents. These characteristics limit its usefulness.

We have now discovered that mixtures of styrene and oiticica oil or its derivatives may be polymerized to resinous products of considerable utility. In particular we have discovered that mixtures of styrene and a small proportion of oiticica oil, i. e., less than about 5 per cent by weight, may be polymerized to form a resin which has the desirable qualities of polystyrene, but not the disadvantageous properties mentioned above. This new resin is a clear, substantially colorless material which does not dissolve to an observable extent when in contact with common organic solvents, such as benzene, toluene, ethylene chloride, etc., which dissolve polystyrene. It has little if any tendency to blush or check, even on prolonged standing, is stronger and much tougher than polystyrene, and possesses a higher degree of light stability than the latter material.

In preparing our new resins, we prefer to heat a mixture of styrene and a suitable proportion of oiticica oil at a temperature between about 100° C. and about 140° C. until polymerization is substantially complete, usually in three days or less. The polymerization may, however, be carried out by any of several other methods commonly employed in polymerizing styrene, e. g., by allowing the mixture to stand for a long period of time at room temperature, by heating the mixture at elevated temperatures other than those hereinbefore mentioned, or by the use of polymerization catalysts such as sulfuric acid, peroxides, etc.

Oiticica oil cannot be extracted from our new resinous products. Also, when polymerized styrene is merely mixed with the oil, e. g., by mastication on hot rolls, the mixture so obtained does not possess the desirable properties of our resins. In view of these facts, it is believed that the oil in our products is chemically combined with the styrene and that the new resins are true copolymers of styrene and oiticica oil.

The properties of the resins prepared in accordance with the invention may be varied widely by changing the proportions of styrene and oiticica oil. When a mixture of styrene and a small proportion, e. g., about 0.02 to about 5 per cent by weight, preferably 0.05 to 2.0 per cent, of the oil is polymerized, the resulting product is the tough, transparent, insoluble, light-stable resin hereinbefore described. When styrene containing a larger proportion of oiticica oil, e. g., up to 50 per cent, is polymerized, the resin formed is an insoluble, soft, rubber-like mass which may be employed in the linoleum and rubber industries. When less than about 0.02 per cent of oiticica oil is present, the polymer is soluble in organic solvents and resembles pure polystyrene.

Although in its preferred form our invention relates to copolymers of styrene and oiticica oil, we may also employ certain oiticcia oil derivatives. The natural oiticica oil consists chiefly of the glycerides of certain complex highly unsaturated straight-chain organic acids, which, for the present purpose, will be termed oiticica oil acids. These acids may be liberated from oiticica oil by subjecting the latter to hydrolysis, either by means of steam or by treatment with alkalies and subsequent acidification. The oiticica oil acids thus obtained may, if desired, be esterified with monohydric or polyhydric alcohols according to usual esterification procedures. The esters so formed, which are herein referred to as synthetic oiticica esters, are similar to the natural oil in many respects. Both the oiticica oil acids and the synthetic oiticica esters may be employed in our invention in the manner hereinbefore described with regard to the natural oil. The polymeric products formed closely resemble those obtained with the natural oiticica oil.

The following examples serve to illustrate our invention, but are not to be construed as limiting the scope thereof:

Example 1

A mixture of 99 parts by weight of styrene and 1 part of oiticica oil is heated at a temperature of about 125° C. for three days. The product obtained is a hard, clear, colorless resin which is much tougher than polystyrene. The resin does not dissolve or swell when contacted with naphtha, acetone, and ethoxy ethanol. It does not dissolve, but swells somewhat in ethyl acetate, carbon tetrachloride, ethylene dichloride, benzene, and toluene.

Example 2

The product prepared as in Example 1 is ground and then dried under reduced pressure at a temperature of about 80° C. for several hours. The powder so obtained may be compression-molded in the usual manner into a wide variety of articles which do not blush or check appreciably on long standing and which are less subject to discoloration on exposure to light than similar articles made of pure polystyrene. The powder may also be molded into rods or bars which are readily machineable.

*Example 3*

A mixture of 50 parts by weight of styrene and 50 parts of oiticica oil is heated at a temperature of about 125° C. for 3 days. The product obtained is a soft, rather elastic material somewhat resembling crude rubber.

Other modes of applying the principle of the invention may be employed instead of those explained, change being made as regards the details hereinbefore disclosed, provided the product or method stated by any of the following claims or the equivalent of such stated product or method be employed.

We therefore particularly point out and distinctly claim as our invention:

1. As a new composition of matter, the copolymer of styrene and between about 0.02 and about 5 per cent of a substance selected from the class consisting of oiticica oil, oiticica oil acids and synthetic oiticica esters, which copolymer is a tough resinous material substantially insoluble in common organic solvents.

2. As a new composition of matter, the copolymer of styrene and between about 0.02 and about 5 per cent of oiticica oil, which copolymer is a tough resinous material substantially insoluble in common organic solvents.

3. As a new composition of matter, the copolymer of styrene and between about 0.05 and about 2.0 per cent of oiticica oil, which copolymer is a tough resinous material substantially insoluble in common organic solvents.

4. The method which comprises polymerizing a mixture of styrene and between about 0.02 and about 5 per cent by weight of oiticica oil.

5. The method which comprises heating a mixture of styrene and between about 0.05 and about 2.0 per cent by weight of oiticica oil at a temperature between about 100° C. and about 140° C. until polymerization of the mixture is substantially complete.

6. As a new composition of matter, the copolymer of styrene and between about 0.02 and about 50 per cent by weight of a substance selected from the class consisting of oiticica oil, oiticica oil acids and synthetic oiticica esters, the said copolymer being substantially insoluble in common organic solvents.

7. The method which comprises polymerizing a mixture of styrene and between about 0.02 and about 50 per cent by weight of a substance selected from the class consisting of oiticica oil, oiticica oil acids and synthetic oiticica esters.

SHAILER L. BASS.
SYLVIA M. STOESSER.
ROBERT D. LOWRY.